T. J. COOKSON.
STEAM TRAP.
APPLICATION FILED NOV. 5, 1913.
1,233,450.
Patented July 17, 1917.
2 SHEETS—SHEET 1.
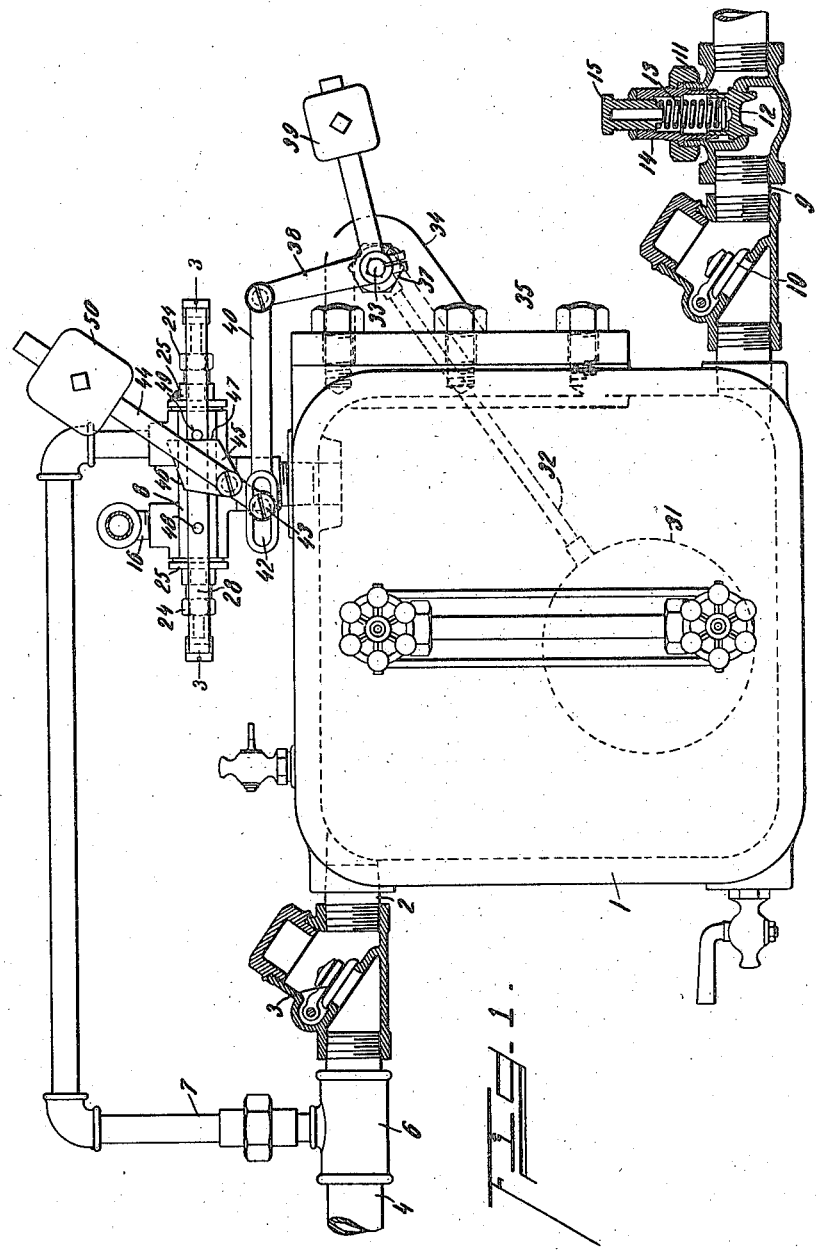
Witnesses
C. B. Foster
Louise A. Beck
Inventor
Thomas J. Cookson
By Wood Wood & Nathan
Attorney T. J. COOKSON.
STEAM TRAP.
APPLICATION FILED NOV. 5, 1913.
1,233,450.
Patented July 17, 1917.
2 SHEETS—SHEET 2.
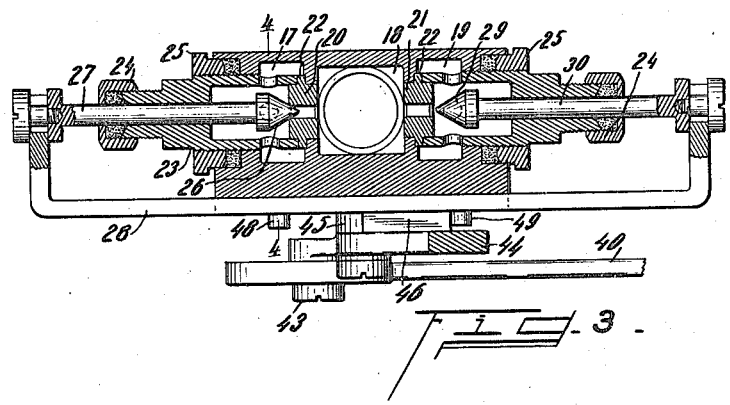
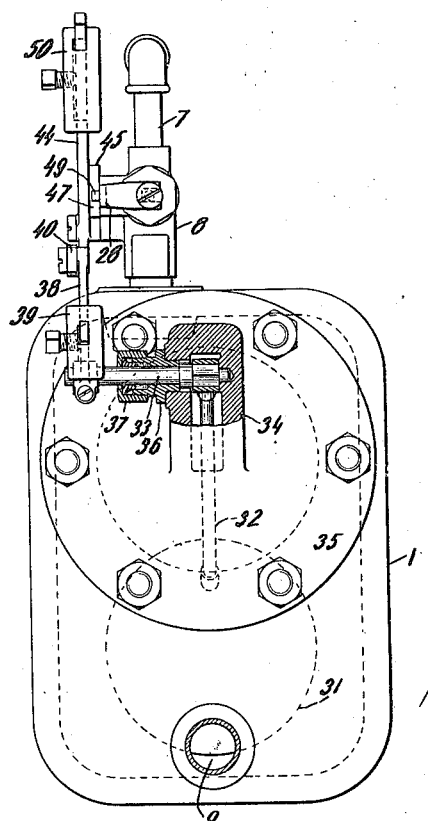
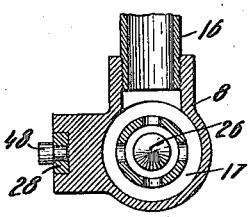
Inventor
Thomas J. Cookson
Witnesses
By Wood Wood + Nathan
Attorneys

UNITED STATES PATENT OFFICE.

THOMAS J. COOKSON, OF CINCINNATI, OHIO.

STEAM-TRAP.

1,233,450.	Specification of Letters Patent.	Patented July 17, 1917.

Application filed November 5, 1913. Serial No. 799,257.

*To all whom it may concern:*

Be it known that I, THOMAS J. COOKSON, a citizen of the United States, residing at Cincinnati, in the county of Hamilton and State of Ohio, have invented certain new and useful Improvements in Steam-Traps, of which the following is a specification.

My invention relates to automatic traps for collecting the condensation in a steam system and discharge the same therefrom without interruption or interference to the system, or reduce its pressure. The water discharged may be delivered for re-use, or purposes resulting from or demanded by economical engineering practice, as, for instance, returning it to the boiler or feed water heater.

An object of my invention is to provide a steam trap with valve controlled inlet and discharge, the valves capable of automatic operation and controlled by the prevailing pressure on either side thereof, with a branch connection by-passing the inlet beyond the valve for equalizing the pressure upon both sides of the valve, so as to permit the condensation to pass through the valve into the trap or receiver by gravity, and in controlling means for cutting out said by-pass without interrupting the steam system to disconnect the trap or receiver therefrom, for discharging the water collected, with an automatic restoration after a discharge of water.

Another object of my invention is to provide a trap or receiver capable of being alternately connected with two branches, one for permitting the receiver to be filled and the second utilized for its discharge, controlled by opposing valves movable unitarily and actuated by the collected liquid within the trap.

Another object of my invention is to provide a trap or receiver with a discharge controlled by a regulated pressure valve requiring a preponderance of pressure within the receiver or trap above the predetermined pressure of the valve to open the same, together with means controlled by the volume of water within the receiver to operate valve mechanism for admitting pressure into the receiver, to discharge its contents.

Another object of my invention is to provide a trap with a manifold inlet valve body, having a common discharge chamber, with oppositely disposed valve seats respectively communicating with said chamber and valves unitarily connected for alternate co-operation with their respective seats for relative successive control of the manifold inlets in their communication with the common discharge chamber.

Various other features of my invention will be more fully set forth, and other objects will be in part obvious from the annexed drawings, and in part indicated in connection therewith by the following analysis of this invention which will enable others skilled in the art to fully comprehend the underlying features thereof. The drawings, depicting a preferred form, have been annexed as a part of this disclosure, and in such drawings like characters of reference denote corresponding parts throughout all the views, of which:—

Figure 1 is a side elevation of my apparatus in position for use, illustrating the terminals of its branch connection with the system with which it may be connected, and illustrating the check valves at the inlet and discharge ends in section.

Fig. 2 is an end elevation of Fig. 1, with the discharge valves omitted and the fulcrum of the float shown in section.

Fig. 3 is a section on line 3—3, Fig. 1.

Fig. 4 is a section on line 4—4, Fig. 3.

In the disclosure herein, special reference is made to its use in connection with a vacuum steam system, offering one of the most perplexing problems for trap utilization, the non-effective to the operative results of the system. If air is admitted into the vacuum system, no matter how small the quantity, it will lower the vacuum. The trap operating, as it may be said spasmodically, as the intervals of discharge depend upon the rate of condensation accumulation within, the trap, therefore, if air were admitted during each trap discharge period, would cause endless annoyance, loss of power, and interference with the operation of the plant.

To aid in the understanding of the invention, I will describe the operation of the apparatus as connected with a vacuum heating system. The trap or receiver 1 provides a reservoir for collecting the condensation of the steam system which enters the reservoir at the upper end through an inlet pipe 2, in communication with the steam system, and for the purposes herein, it is designated as the inlet branch.

A valve 3 is connected to the pipe 2 in series with the inlet branch, representing a check valve of common type, with its seat opening toward the receiver and closing to pressure within the receiver greater than that within the system. To balance the pressure on both sides of the valve so as to permit the condensed water to flow through the same, I provide an equalizing branch 7, comprising piping connected at one end to the T-coupling 6 beyond the valve 3, with the opposite end connected to a manifold fitting 8, which manifold fitting has a common outlet leading into the receiver.

Thus, under normal conditions, the pressure on both sides of the valve being equalized, the water of condensation can pass from the system or branch 4, through the valve 3, into the receiver.

After a predetermined quantity of water has collected within the receiver, the equalizing branch is broken or shut off from communicating with the receiver. The valve 3 closes against the receiver, so as not to disturb the effectiveness of the vacuum system, or reduce its pressure.

The water is discharged from the receiver through the outlet branch 9, by admitting atmospheric pressure, or a positive pressure into the receiver, and in the present arrangement is controlled by two valves, although in some systems one would be sufficient. These valves comprise a check valve 10, and a regulating pressure valve 11. The check valve may be of common gravity type, while the regulating pressure valve comprises a valve member 12 engaged by a spring 13 within the bonnet sleeve 14, clamped to the valve body, and 15 represents an adjusting screw engaging the spring for regulating its tension against the valve 12. Therefore, before water can be discharged from the receiver, the receiver must have an internal pressure greater than the pressure of the spring. This pressure regulating valve may be regarded as an emergency valve to prevent discharge of the water by reason of any diminishing negative pressure within the receiver which may cause the check valve to open by gravity, or weight of the column of water within the receiver. Under general conditions, however, the vacuum within the receiver would tend to maintain the check valve closed. The water is discharged preferably under pressure, so that it can be forced to any distant point desired or the pressure within the receiver equalized with the pressure of the boiler to permit the water to flow by gravity into the boiler.

The manifold fitting has a second pressure branch connection 16, which may be connected with the boiler or other apparatus for providing pressure to the receiver.

The branches 9 and 16 are valve controlled, and in the arrangement herein alternately communicate with the receiver. The manifold fitting 8 is subdivided into three chambers 17, 18, and 19, with chambers 17 and 19 communicating with the chamber 18, through the valve seat members 20, 21, respectively. These members are of reversible construction, providing oppositely disposed seats, one upon each side of the annular flange 22, which flange engages against the division wall of two chambers. Each reversible seat member is held in position by a valve bonnet 23, screw threaded within the body of the manifold fitting and provided with the stuffing-box caps 24, 25, for sealing the stem of the valve and bonnet against leakage.

In the arrangement shown, the valve seats and their valves are oppositely disposed, with the valves unitarily connected in order to alternately engage with their respective seats in controlling the alternate communication of the equalizing and pressure branches 7 and 16 with the inlet to the receiver.

26 represents a valve of needle type adapted to engage with the seat 20, for controlling the pressure to the receiver. It is provided with a stem 27 rigidly connected to the yoke bar 28. 29 represents a valve adapted to engage with the seat 21, for controlling the equalizing pressure within the receiver, said valve being provided with a stem 30, projecting through its bearing bonnet 23, and rigidly connected to the yoke bar 28. These valves are operated by float and lever mechanism and are controlled by the volume or quantity of water within the receiver, the valve actuating mechanism comprising a float 31, fixed to the stem 32, so as to swing vertically within the receiver. The stem is fixed to the axle 33, one end thereof journaled in a recessed projection 34, projecting from the cap plate 35, bolted to the receiver, the cap plate being removable for access into the receiver, and for inserting and removing the float. The axle is also journaled in the stuffing box sleeve 36, screw threaded within a bore formed within the recessed projection 34, (see Fig. 2), and 37 represents a stuffing-box cap screw threaded upon the bearing sleeve 36. The axle 33, upon its outer end, has a bell crank lever 38 fixed thereto, one arm carrying a weight 39 adjustable thereon, while its second arm is pivotally connected to a link 40. The opposite end of the link 40 is provided with an elongated slot 42, to receive the screw 43, of the lever 44, which engages with the yoke bar 28, to shift the valves.

The lever 44 is pivotally mounted upon the manifold fitting 8, and is provided with the element 45, having two oppositely disposed angular surfaces or shoulders 46, 47, adapted to respectively engage with the pins 48, 49, projecting from the yoke arm 28 to reciprocate the valve. The surface of the shoulders 46, 47, do not engage with their respective yoke bar pins until after the lever 44 has been moved beyond its vertical central position, after which it is automatically and quickly moved by the weight 50, to shift the valves and maintain a pressure upon the seated valve. The connecting end of the lever 44 moves idly in the slot of the connecting link 40, in the valve shifting movement. The slot also functions to limit the valve operation toward the limits of float movement to provide the desired interval for receiver charging and discharging.

With the trap connected to a vacuum system, the parts will occupy positions, shown in Fig. 1, with the by-pass or equalizing branch 7 open to the receiver, thereby equalizing the pressure upon both sides of the check valve 3, which permits the condensed steam to flow by gravity through said check valve into the receiver, continuing until the quantity of water collected within a receiver reaches a height to cause the float 31, to rise sufficiently to move the valve controlling lever 44 to the left, which after it moves beyond the dead center will shift the valves so as to close the equalizing branch from the receiver, the vacuum, in the system to be drained holding the check valve closed, thereby preventing any disturbance to the system, for no air or pressure can be admitted therein.

The valves in such instance will occupy an alternate position from that shown in Fig. 3, opening the pressure branch 16 to the receiver for admitting pressure to discharge the contents of the receiver, raising the check valve and regulating pressure valve, forcing the water to any point desired. The pressure branch 16 may be in connection with the boiler and therefore when open to the receiver equalizes the pressure within the receiver with that of the boiler, and with the trap at a higher elevation than the boiler, the collected water within the receiver can flow by gravity into the boiler. In such instances, however, the regulating pressure valve will be omitted.

Having described my invention, I claim:—

An apparatus of the nature disclosed combining a receiver having automatic valve controlled inlet and outlet, a manifold casing exterior of the receiver having chambers communicating with said receiver through relatively opposite valve-seat-equipped openings, one chamber connecting with the receiver valve to by-pass around the said receiver inlet valve, and a second chamber connecting with a pressure branch, a needle valve for each seat opening, means for unitarily connecting said valves exterior of the manifold casing for alternate valve seating, a weighted lever to operate said valve connecting means, the seating of either valve providing lever motion limits, and means responsive to the liquid level in said receiver for moving said lever at predetermined liquid stages.

In testimony whereof, I have hereunto set my hand.

THOMAS J. COOKSON.

Witnesses:
EMMA SPENER,
LOUISE A. BECK.